Feb. 29, 1944. J. M. GWINN, JR., ET AL 2,343,054

PULLEY MOUNT

Filed April 6, 1942

INVENTORS
Joseph M. Gwinn Jr.
Philip Koenig
BY John H. Wallace
AGENT

Patented Feb. 29, 1944

2,343,054

UNITED STATES PATENT OFFICE 2,343,054

PULLEY MOUNT

Joseph M. Gwinn, Jr., and Philip Koenig, San Diego, Calif.

Application April 6, 1942, Serial No. 437,762

6 Claims. (Cl. 254—195)

This invention pertains to improvements in pulley mounts. One object of our invention is to provide means whereby a pulley in its mount may be adjusted in alignment so that a cable or other flexible member reeved through it may transmit its thrust radially to the pulley without side thrust or tendency to displacement off the pulley. A further object of our invention is to provide readily adjustable means for aligning a pulley in its mount with the cable which it guides, so that only a wrench or similar tool is necessary to clamp mounts of our type in adjustment. Still a further object is to provide an adjustable pulley mount which is sturdy, reliable and simple in construction.

Other objects and advantages will be apparent from our specification, and from the accompanying drawing, in which like numerals indicate like parts.

Figure 1:
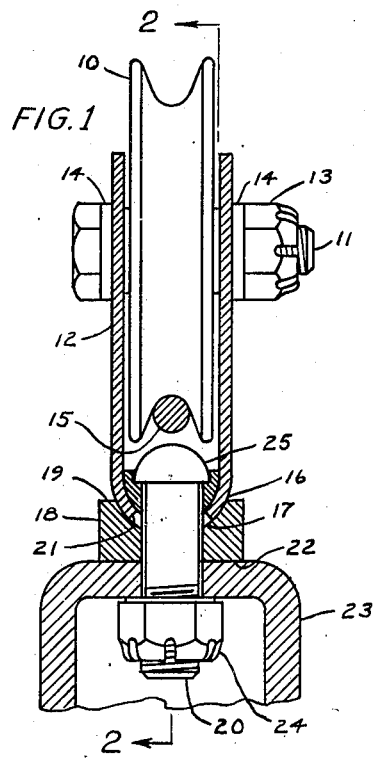
Fig. 1 is a vertical partial cross-section of an adjustable pulley mount embodying our invention.

When cables are changed in direction of pull by means of a pulley wheel, it is desirable that the portion of the cable about the pulley and the entering and leaving cable portions lie in the plane of the pulley. If this condition is not met there is a tendency for the cable in motion to leave the pulley, and a tendency for binding and excessive wear to occur. Our invention permits a pulley to be readily adjusted in correct alignment and to be securely clamped in position after adjustment by means of, in most instances, a wrench as the only tool necessary.

In the drawing, 10 indicates a pulley rotatably mounted on a bolt 11. This bolt is supported as shown by a U-shaped strap member 12, and secured in place by means of a nut 13. Under the head of bolt 11 and under the nut 13 are placed the customary washers 14. A cable 15 is shown reeved around the inner side of the pulley, but it will be readily apparent that our mount may also be used with a cable reeved over any portion of the pulley.

The strap 12 is bent semi-cylindrically as shown at 16. We have shown a two-legged or U-shaped strap, but one leg can be omitted leaving a single legged or hook-shaped strap member, if in such case the strap is made heavy enough for rigidity and proper support of pulley bolt 11 by one end only.

The bend of strap member 12 rests in a correspondingly curved seat 17 formed in a base block 18. A substantially semi-cylindrical clamp block 19 rests as shown in the bend of strap 12. Members 18 and 19 are centrally apertured to receive a clamp bolt 20 passed therethrough. Strap 12 has an elongated slot 21 centrally arranged in its bend as shown, through which clamp bolt 20 also passes.

Figure 2:
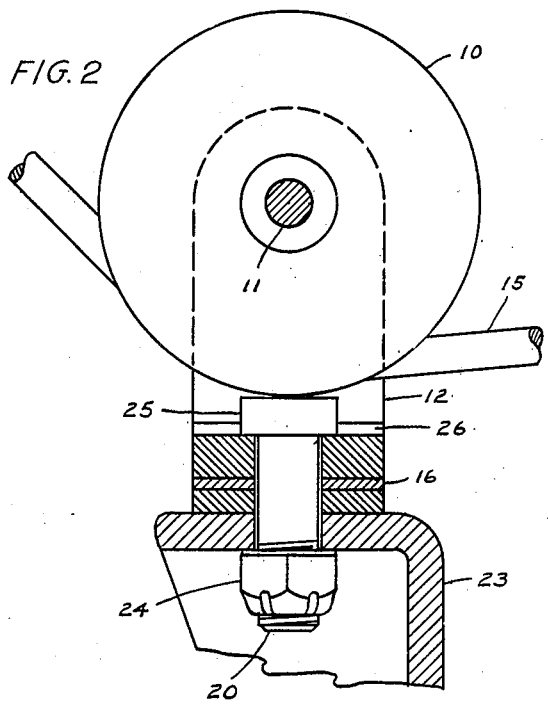
Fig. 2 is a partial cross-sectional view taken along the line 2—2 of Fig. 1.

The under surface 22 of the base block is fastened to any supporting structure such as that indicated at 23, and is secured thereto by means of clamp bolt 20. A nut 24 is provided on the threaded end of clamp bolt 20. The other end of the clamp bolt is provided with a head 25 which is preferably, though not of necessity, made substantially semi-cylindrical in shape. The flat or chordal surface of clamp block 19 is provided with a shallow groove or recess 26 into which bolt head 25 seats, thereby preventing clamp bolt 20 from turning when nut 24 is tightened, and thus obviating the necessity for holding the clamp bolt with a second wrench, since the entire mount may be prevented from turning by holding it with one hand. The curved upper surface of the clamp bolt head 25 is preferably a circular arc on the same center as the curved portion 16 of strap 12. Thus bolt head 25 is located close enough to pulley 10 to prevent the cable from leaving the pulley groove, has a substantially constant clearance of the pulley regardless of the side-to-side adjustment of the strap, and presents a smooth surface to the cable. While the preferred form of clamp bolt shown in Figs. 1 and 2 has a semi-cylindrical head, a cheaper form of clamp bolt may be made from a standard hexagonal-headed bolt by turning the head to a generally spherical shape so as to give approximately constant clearance of the pulley (as in the case of the semi-cylindrical head), but with enough of the flats of the hexagonal head left so that it will be prevented from turning by the sides of the recess in clamp block 19. We have not shown this form of clamp bolt, but believe that from this brief description its construction will be apparent to those skilled in the art.

In order to adjust our pulley mount to the correct angle the entire mount is rotated about the clamp bolt until the pulley lies approximately in the desired plane of the cable bight.

The strap is then swung angularly on the arcuate seat in the base block until the proper adjustment is attained, after which, the nut 24 is tightened with a wrench while the mount is held by hand to prevent its disalignment. To prevent any tendency of the mount to work loose or to rotate about clamp bolt 20 under extreme service conditions, its frictional grip against the supporting structure 23 may be improved by serrating, knurling, or otherwise roughening the under surface 22 of the base block 18. Likewise, the strap 12 may be more securely clamped in angular adjustment by serrating, knurling or otherwise roughening the arcuate surface of clamp block 19, base block 18, or the strap itself.

Figure 3:
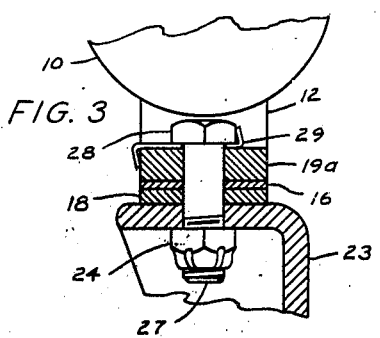
Figs. 3 and 4 are partial cross-sectional views similar to Fig. 2, but showing other forms of clamping bolts used with our pulley mount.
Figure 5:
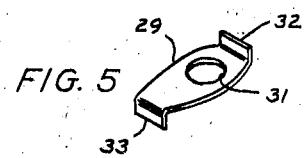
Fig. 5 is an isometric view of the tab washer used in Fig. 3 for holding the head of the clamping bolt.

In Fig. 3 we have shown the use of a standard hexagonal headed bolt 27 as a clamp bolt. A bolt with a square head would serve as well. In this case clamp block 19a is preferably made without the shallow groove 26 of the clamp block 19 of Figs. 1 and 2, and in order to prevent the clamp bolt from turning we employ a tab washer 29, apertured at 31, as shown in Fig. 5, and provided with oppositely directed tabs 32 and 33. The clamp bolt 27 passes through the aperture 31 in the tab washer, one tab of which engages the clamp block 19a, the other tab engaging a flat of bolt head 23, thus preventing the clamp bolt from rotating when nut 24 is turned.

Figure 4:
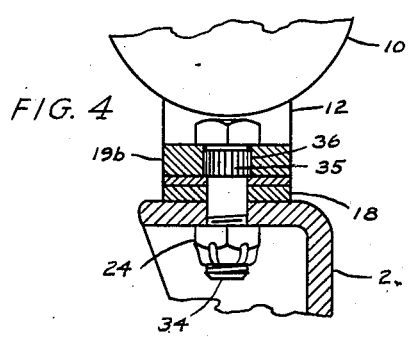

In Fig. 4 there is shown a further modification in which a clamp bolt 34 has a splined portion 35 which interengages with the internally splined hole 36 in clamp block 19b and thus prevents the bolt from rotating when nut 24 is turned. Clamp block 19b is likewise in this case preferably made without the groove 26 of clamp block 19, and the head of clamp bolt 34 may be of any desired shape.

We claim:

1. A pulley mount comprising in combination a rotatable pulley, a rebent and apertured strap member adapted to support said pulley, an apertured base block having an arcuate groove into which the bend of said strap member is adapted to seat, an apertured clamp block having a chordal face and an arcuate face and adapted to seat in the bend of said strap member, said clamp block having a groove in the chordal face thereof, and a clamp bolt extending through said clamp block, strap member and base block and having a T-head adapted to seat comparatively snugly in the groove in said clamp block, whereby said clamp bolt is prevented from rotating relative to the pulley mount when being tightened or loosened.

2. In a pulley mount, the combination of a strap having a pair of side arms and a connecting portion in the form of an arc convex outwardly, a base block having a recess in which said convex portion seats, a clamping block within the strap curved complementarily of the strap and seating against the same and having a groove in its exposed face, and a T-bolt having a head occupying said groove in a manner to prevent rotation of said bolt relative to said clamping block and a shank extending through the clamping block, through the curved connecting portion of the strap and through the base block, and a nut on the shank.

3. In a pulley mount, the combination of a strap having a pair of side arms and a connecting portion in the form of a circular arc convex toward the outside, a pulley between said arms, a base having a groove in which said convex portion seats, a clamping device comprising a block within the strap curved complementarily of the strap and seating against the same and a shank extending from the block through the curved connecting portion of the strap and into the base, the seating arc of the strap having its center of radii on said clamping device.

4. A pulley mount comprising in combination, a strap having two substantially parallel arms connected by a substantially semi-circular portion, said portion having a transverse arcuate slot through it, a base block having a complementary groove in which the connecting portion of the strap seats, a clamping block within the strap curved complementarily to the inner face of the strap, a bolt mounted in the clamping block extending through the slot and strap and through the base block and carrying a clamping nut, the center of radii of the semi-circular connecting portion of the strap being on said bolt, whereby stresses are carried directly to the bolt, and a pulley rotatably mounted between the arms of the strap.

5. A pulley mount comprising a substantially U-shaped strap providing two arms connected by a return bend, a pulley mounted between said arms, a grooved seat for the strap on the exterior thereof, a clamping block within the strap, a headed bolt passing through the clamping block and through the strap and into the seat, the head of said bolt being curved on substantially the same center as the return bend of the strap, so that the distance between the pulley and the bolt head is substantially constant irrespective of the tipping of the strap.

6. A pulley mount comprising a substantially U-shaped strap providing two arms connected by a return bend, a grooved pulley mounted between said arms, a grooved seat for the strap on the exterior thereof, a clamping block within the strap, and a headed bolt passing through the clamping block and through the strap and into the seat, the head of said bolt being non-circular and seating in a groove in the clamping block in a manner to prevent rotation of the bolt relative to said clamping block, said head projecting beyond the clamping block toward the pulley groove to prevent escape of the cable riding in said groove.

JOSEPH M. GWINN, Jr.
PHILIP KOENIG.